(12) United States Patent
Xu et al.

(10) Patent No.: US 11,960,709 B2
(45) Date of Patent: Apr. 16, 2024

(54) METHOD AND APPARATUS FOR DISPLAYING ACTIVE FRIEND INFORMATION, ELECTRONIC DEVICE, AND STORAGE MEDIUM

(71) Applicant: BEIJING BYTEDANCE NETWORK TECHNOLOGY CO., LTD., Beijing (CN)

(72) Inventors: Jiannan Xu, Beijing (CN); Weiyi Chang, Beijing (CN); Chao Zhang, Beijing (CN); Ruipeng Liu, Beijing (CN); Lianying Li, Beijing (CN); Yuchen Peng, Beijing (CN); Ziyang Zheng, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/887,627

(22) Filed: Aug. 15, 2022

(65) Prior Publication Data

US 2022/0391059 A1    Dec. 8, 2022

Related U.S. Application Data

(63) Continuation of application No. PCT/CN2021/112811, filed on Aug. 16, 2021.

(30) Foreign Application Priority Data

Aug. 25, 2020   (CN) .................... 202010868841.X

(51) Int. Cl.
  *G06F 3/048*   (2013.01)
  *G06F 3/0482*  (2013.01)
  *G06F 3/0484*  (2022.01)

(52) U.S. Cl.
  CPC .......... *G06F 3/0484* (2013.01); *G06F 3/0482* (2013.01)

(58) Field of Classification Search
  CPC ... G06F 3/04842; G06F 3/0481; H04L 67/54; H04L 51/04; H04L 51/222; H04L 51/043;
  (Continued)

(56) References Cited

U.S. PATENT DOCUMENTS 6,212,548 B1 * 4/2001 DeSimone .......... H04L 12/1813
                                                    719/329
6,907,422 B1 * 6/2005 Predovic ............... G06F 16/284
(Continued)

FOREIGN PATENT DOCUMENTS

CN   101977238 A   2/2011
CN   103942213 A   7/2014
(Continued)

OTHER PUBLICATIONS

International Search Report dated Nov. 17, 2021 in International Application No. PCT/CN2021/112811.
(Continued)

*Primary Examiner* — Steven B Theriault

(57) ABSTRACT

Provided are a method and apparatus for displaying active friend information, an electronic device, and a storage medium. The method for displaying the active friend information includes receiving an activity information checking instruction, where the activity information checking instruction is generated when a user triggers an entry control on a message page; and displaying an active friend list, where the active friend list displays activity information of an active friend of the user, and the active friend is a friend who is online in a recent preset time period. In this manner, a (Continued)

process of checking the active friend information is simplified and the time spent on checking the active friend information is shortened.

15 Claims, 11 Drawing Sheets

(58) Field of Classification Search
CPC ....... H04L 51/52; H04L 67/306; H04L 67/75; H04L 61/4594; H04W 4/08; H04M 1/724
See application file for complete search history.

(56) References Cited

U.S. PATENT DOCUMENTS

| | | | | |
|---|---|---|---|---|
| 7,219,303 | B2* | 5/2007 | Fish | H04L 67/52 715/741 |
| 7,311,608 | B1* | 12/2007 | Danieli | A63F 13/795 463/42 |
| 7,676,759 | B2* | 3/2010 | Carter | G06F 3/0485 715/830 |
| 7,685,237 | B1* | 3/2010 | Weaver | H04L 51/04 709/205 |
| 7,769,144 | B2* | 8/2010 | Yao | G06Q 10/107 715/752 |
| 7,797,642 | B1* | 9/2010 | Karam | G06Q 10/107 715/764 |
| 7,979,802 | B1* | 7/2011 | Appelman | G06F 3/0482 715/752 |
| 8,095,665 | B1* | 1/2012 | Bau | H04L 67/303 709/227 |
| 8,132,110 | B1* | 3/2012 | Appelman | G06F 3/0482 715/752 |
| 8,255,811 | B2* | 8/2012 | Lynn | H04M 1/2746 715/753 |
| 8,555,177 | B1* | 10/2013 | Junee | G06F 3/0481 715/756 |
| 8,726,171 | B1* | 5/2014 | Lachapelle | H04M 1/2748 715/752 |
| 8,808,093 | B1* | 8/2014 | Reynolds | A63F 13/822 463/43 |
| 8,959,164 | B2* | 2/2015 | Appelman | G06Q 10/107 715/752 |
| 8,996,987 | B2* | 3/2015 | Rivera | G06F 3/0481 715/830 |
| 9,319,357 | B2* | 4/2016 | Moyers | H04L 51/046 |
| 9,356,894 | B2* | 5/2016 | Appelman | G06Q 50/01 |
| 9,763,070 | B2* | 9/2017 | Nordstrom | H04L 67/306 |
| 10,003,624 | B2* | 6/2018 | Van Wie | H04L 41/22 |
| 10,122,723 | B1 | 11/2018 | Chang et al. | |
| 10,469,646 | B2* | 11/2019 | Kim | H04M 1/27453 |
| 10,956,458 | B2* | 3/2021 | Baumann | G06Q 10/103 |
| 11,244,376 | B1* | 2/2022 | Van Thomme | G06Q 30/0633 |
| 11,291,921 | B1* | 4/2022 | Schindler | H04L 67/131 |
| 11,461,736 | B2* | 10/2022 | Hirasawa | G06V 40/172 |
| 2003/0018726 | A1* | 1/2003 | Low | H04L 69/08 709/224 |
| 2003/0210265 | A1* | 11/2003 | Haimberg | H04L 51/043 715/758 |
| 2004/0054735 | A1* | 3/2004 | Daniell | H04L 69/18 715/752 |
| 2004/0056893 | A1* | 3/2004 | Canfield | G06Q 10/107 715/753 |
| 2004/0179039 | A1* | 9/2004 | Blattner | H04L 51/046 715/758 |
| 2004/0196315 | A1* | 10/2004 | Swearingen | G06Q 10/107 715/804 |
| 2005/0055405 | A1* | 3/2005 | Kaminsky | H04L 51/04 709/224 |
| 2005/0169446 | A1* | 8/2005 | Randall | H04M 1/576 379/93.23 |
| 2005/0234885 | A1* | 10/2005 | Szeto | G06F 16/9535 |
| 2006/0023915 | A1* | 2/2006 | Aalbu | G01S 13/04 382/103 |
| 2006/0167991 | A1* | 7/2006 | Heikes | H04L 51/04 709/204 |
| 2006/0205518 | A1* | 9/2006 | Malabuyo | A63F 13/10 463/43 |
| 2007/0002057 | A1* | 1/2007 | Danzig | A63F 13/63 345/473 |
| 2007/0043828 | A1* | 2/2007 | Famolari | H04L 51/214 709/219 |
| 2007/0113181 | A1* | 5/2007 | Blattner | G06Q 10/107 715/753 |
| 2007/0113196 | A1* | 5/2007 | Wang | G06F 3/0483 715/791 |
| 2007/0162432 | A1* | 7/2007 | Armstrong | H04L 65/403 |
| 2007/0168863 | A1* | 7/2007 | Blattner | G06F 3/011 715/706 |
| 2008/0133580 | A1 | 6/2008 | Wanless et al. | |
| 2008/0261569 | A1* | 10/2008 | Britt | G06Q 10/107 455/566 |
| 2009/0055369 | A1* | 2/2009 | Phillips | G06F 16/9535 |
| 2009/0083299 | A1* | 3/2009 | Chen | G06Q 10/107 |
| 2009/0204908 | A1* | 8/2009 | Ganz | G06Q 10/10 715/757 |
| 2009/0222766 | A1* | 9/2009 | Chae | G06F 3/0482 715/702 |
| 2009/0239558 | A1* | 9/2009 | Choi | H04L 12/1831 455/466 |
| 2009/0271370 | A1* | 10/2009 | Jagadish | H04L 51/52 709/204 |
| 2009/0274286 | A1* | 11/2009 | O'Shaughnessy | H04M 1/7243 379/201.12 |
| 2010/0198742 | A1* | 8/2010 | Chang | G06Q 10/00 709/224 |
| 2010/0330972 | A1 | 12/2010 | Angiolillo | |
| 2011/0003585 | A1* | 1/2011 | Wang | H04M 1/72469 455/418 |
| 2011/0066949 | A1 | 3/2011 | DeLuca et al. | |
| 2011/0153618 | A1* | 6/2011 | Basu | G06F 16/9535 707/E17.046 |
| 2011/0202859 | A1* | 8/2011 | Fong | G06F 3/04886 715/769 |
| 2011/0258559 | A1* | 10/2011 | You | G06Q 10/107 715/752 |
| 2012/0066306 | A1* | 3/2012 | Leacock | G06Q 10/10 709/204 |
| 2012/0124150 | A1* | 5/2012 | Ge | H04L 67/535 709/204 |
| 2012/0159393 | A1* | 6/2012 | Sethi | G06F 16/248 715/830 |
| 2012/0210253 | A1* | 8/2012 | Luna | G06F 3/0482 715/753 |
| 2013/0007590 | A1 | 1/2013 | Rivera et al. | |
| 2013/0054694 | A1* | 2/2013 | Maeng | G06Q 50/01 709/204 |
| 2013/0144961 | A1* | 6/2013 | Park | H04L 67/62 709/206 |
| 2013/0225298 | A1* | 8/2013 | Hamlin | G06Q 10/10 463/42 |
| 2014/0024362 | A1* | 1/2014 | Kang | H04M 3/02 455/422.1 |
| 2014/0172962 | A1* | 6/2014 | Zhu | H04L 67/10 709/203 |
| 2014/0173003 | A1* | 6/2014 | Van | G06Q 10/10 709/206 |
| 2014/0269657 | A1* | 9/2014 | Kim | H04W 4/021 370/338 |
| 2014/0325385 | A1* | 10/2014 | Zhang | H04L 51/04 715/752 |
| 2014/0351338 | A1* | 11/2014 | Kaneoka | H04L 67/306 709/204 |
| 2014/0365917 | A1 | 12/2014 | Luna et al. | |
| 2015/0046542 | A1* | 2/2015 | Yamamoto | H04L 12/1822 709/206 |
| 2015/0113439 | A1* | 4/2015 | Kimura | G06Q 50/01 715/752 |
| 2015/0127731 | A1* | 5/2015 | Hamada | H04L 65/40 709/204 |

(56) References Cited

U.S. PATENT DOCUMENTS

| | | | |
|---|---|---|---|
| 2015/0287107 A1* | 10/2015 | Alakoye | G06Q 50/01 |
| | | | 705/14.73 |
| 2016/0217612 A1* | 7/2016 | Petill | G06T 7/70 |
| 2016/0239814 A1* | 8/2016 | Bianchi | G06F 16/11 |
| 2017/0126460 A1 | 5/2017 | Dutronc et al. | |
| 2017/0173476 A1* | 6/2017 | Schindler | G06Q 30/0261 |
| 2018/0006976 A1* | 1/2018 | Ye | H04L 51/043 |
| 2018/0019964 A1* | 1/2018 | Larson | H04L 67/306 |
| 2018/0210630 A1* | 7/2018 | Hiranuma | G06F 3/0483 |
| 2018/0331996 A1 | 11/2018 | Zhang et al. | |
| 2020/0213326 A1* | 7/2020 | Herman | H04L 51/10 |
| 2020/0257749 A1* | 8/2020 | Li | G06Q 50/01 |
| 2021/0064317 A1* | 3/2021 | Juenger | G09G 5/14 |
| 2022/0129120 A1* | 4/2022 | Fujii | A63F 13/533 |

FOREIGN PATENT DOCUMENTS

| | | |
|---|---|---|
| CN | 106600298 A | 4/2017 |
| CN | 108881214 A | 11/2018 |
| CN | 109003050 A | 12/2018 |
| CN | 109728448 A | 5/2019 |
| CN | 109782977 A | 5/2019 |
| CN | 111083517 A | 4/2020 |
| CN | 111399709 A | 7/2020 |
| CN | 111460049 A | 7/2020 |
| CN | 112035202 A | 12/2020 |
| RU | 2670906 C1 | 10/2018 |

OTHER PUBLICATIONS

First Office Action dated Jun. 10, 2021 in Chinese Patent Application No. 202010868841.X (6 pages) with an English translation (6 pages).

Second Office Action dated Aug. 13, 2021 in Chinese Patent Application No. 202010868841.X (6 pages) with an English translation (8 pages).

Office Action dated Feb. 20, 2023 in IN Appl. No. 202247077176 (pp. 1-5).

European Search Report dated Jul. 27, 2023 in European Application No. 21860195.3 (4 pages).

* cited by examiner

METHOD AND APPARATUS FOR DISPLAYING ACTIVE FRIEND INFORMATION, ELECTRONIC DEVICE, AND STORAGE MEDIUM

CROSS-REFERENCE TO RELATED APPLICATION

This is continuation of International Patent Application No. PCT/CN2021/112811, filed on Aug. 16, 2021, which claims priority to Chinese Patent Application No. 202010868841.X filed with the China National Intellectual Property Administration (CNIPA) on Aug. 25, 2020, the disclosure of which is incorporated herein by reference in its entirety.

TECHNICAL FIELD

The present disclosure relates to the field of computer technologies, for example, a method and apparatus for displaying active friend information, an electronic device, and a storage medium.

BACKGROUND

A user sometimes needs to check active friend information in order to select suitable friends for interaction.

In the related art, the active friend information is generally displayed on a chat page. If the user wants to check activity information of a friend, the user needs to find the friend on a message page and click on a display region of the friend on the message page to enter the chat page of the friend to check the activity information.

However, when activity information of multiple friends needs to be checked, the preceding operation needs to be repeated for each friend, which is cumbersome and takes a relatively long time.

SUMMARY

The present disclosure provides a method and apparatus for displaying active friend information, an electronic device, and a storage medium, so as to shorten the time spent on checking the active friend information.

The present disclosure provides a method for displaying active friend information. The method includes steps described below.

An activity information checking instruction is received, where the activity information checking instruction is generated when a user triggers an entry control on a message page.

An active friend list is displayed, where the active friend list displays activity information of an active friend of the user, and the active friend is a friend who is online in a recent preset time period.

The present disclosure further provides an apparatus for displaying active friend information. The apparatus includes a checking instruction receiving module and a list displaying module.

The checking instruction receiving module is configured to receive an activity information checking instruction, where the activity information checking instruction is generated when a user triggers an entry control on a message page.

The list displaying module is configured to display an active friend list, where the active friend list displays activity information of an active friend of the user, and the active friend is a friend who is online in a recent preset time period.

The present disclosure further provides an electronic device. The electronic device includes one or more processors and a memory configured to store one or more programs.

The one or more programs, when executed by the one or more processors, cause the one or more processors to perform the method for displaying active friend information.

The present disclosure further provides a computer-readable storage medium storing a computer program which, when executed by a processor, is used for performing the method for displaying active friend information.

DETAILED DESCRIPTION

Figure 1:
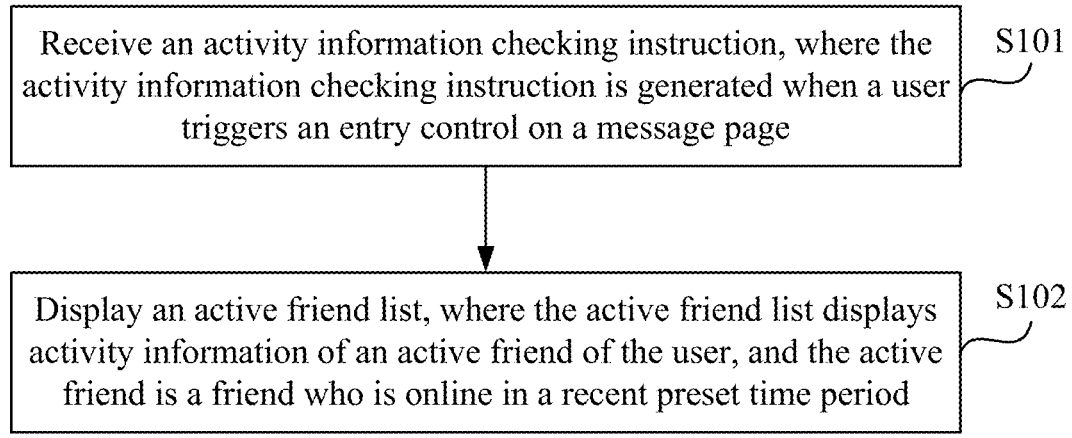
FIG. 1 is a flowchart of a method for displaying active friend information according to an embodiment of the present disclosure.

Embodiments of the present disclosure are described hereinafter with reference to the drawings. Although some embodiments of the present disclosure are shown in the drawings, the present disclosure may be implemented in multiple forms and should not be construed as limited to the embodiments set forth herein. These embodiments are provided so that the present disclosure will be understood.

Multiple steps recited in method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

References to "first", "second" and the like in the present disclosure are merely intended to distinguish one from another apparatus, module, or unit and are not intended to limit the order or interrelationship of the functions performed by the apparatus, module, or unit.

References to modifications of "one" or "a plurality" in the present disclosure are intended to be illustrative and not limiting, and "one or a plurality" are intended unless the context indicates otherwise.

The names of messages or information exchanged between multiple apparatuses in embodiments of the present disclosure are only for illustrative purposes and are not intended to limit the scope of such messages or information.

FIG. 1 is a flowchart of a method for displaying active friend information according to an embodiment of the present disclosure. This method may be performed by an apparatus for displaying active friend information, where the apparatus may be implemented by software and/or hardware and may be configured in an electronic device. For example, the apparatus may be configured in a smart phone or a tablet computer. Optionally, the method for displaying the active friend information provided in the embodiments of the present disclosure is applicable to the scenario of checking the active friend information, for example, the scenario of checking activity information of multiple friends. As shown in FIG. 1, a method for displaying active friend information provided in the embodiments of the present disclosure may include steps described below.

In S101, an activity information checking instruction is received, where the activity information checking instruction is generated when a user triggers an entry control on a message page.

The activity information checking instruction may be an instruction used for instructing an electronic device to pop up an active friend list in which activity information of an active friend is displayed; the message page is a page used for displaying multiple types of messages to the user; the entry control may be understood as a control used for entering the active friend list, where the entry control may be triggered after the user performs a corresponding trigger operation, and the trigger operation, may be, for example, a click operation or a slide operation. The case where the trigger operation of the entry control is the click operation is used as an example for description hereinafter.

Figure 2:
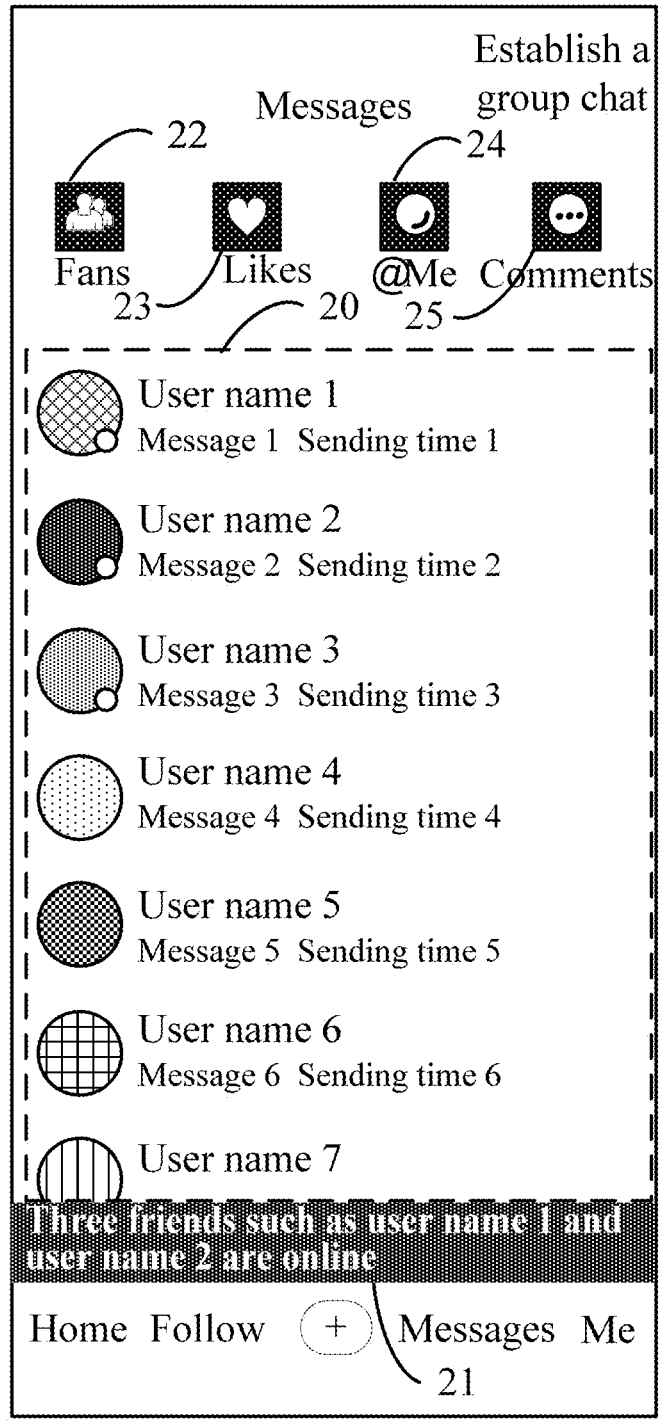
FIG. 2 is a schematic view of a message page according to an embodiment of the present disclosure.
Figure 3:
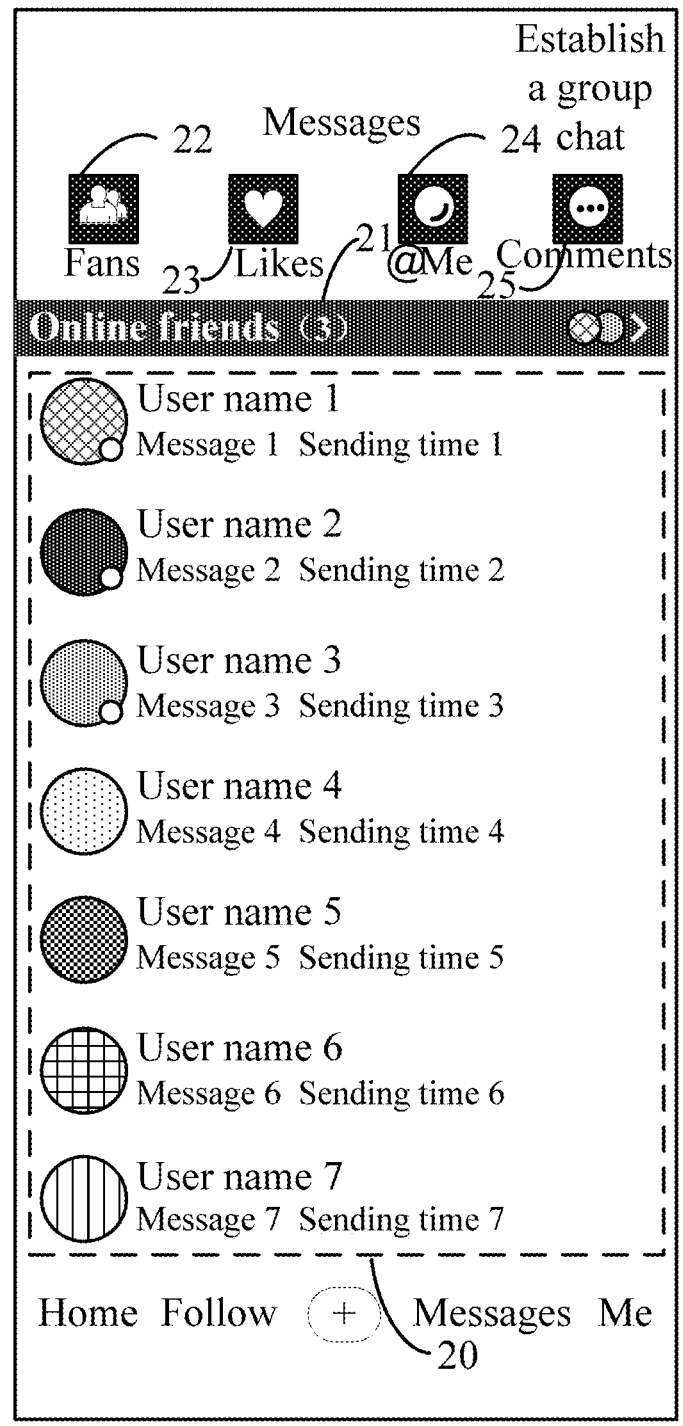
FIG. 3 is a schematic view of another message page according to an embodiment of the present disclosure.

Exemplarily, referring to FIGS. 2 and 3, the electronic device may display a friend list 20 and an entry control 21 on the message page. The friend list 20 may display friend information of each friend of the user, such as the name and avatar of each friend, the last chat message sent by each friend when chatting with the user, and the sending time of the last message. A display position of the entry control 21 on the message page may be flexibly set. For example, the electronic device may display the entry control 21 of the active friend list at the bottom of the message page (as shown in FIG. 2), or may display the entry control 21 of the active friend list at the top of the friend list 20 displayed on the message page (as shown in FIG. 3), or may display the entry control 21 of the active friend list elsewhere on the message page. In addition, the electronic device may also display a fan control 22, a like control 23, an @me control 24 and a comment control 25 on the message page. The user may click on the fan control 22 to check information of users who follow the user, click on the like control 23 to check likes the user receives, check on the @me control 24 to check users or messages mentioned the user, and click on the comment control 25 to check comments received by the user.

With continued reference to FIGS. 2 and 3, the electronic device displays the message page on the screen and displays the entry control 21 of the active friend list at a set position of the message page; when the user wants to check the activity information of the active friend, the user clicks on the entry control 21; correspondingly, after detecting that the user clicks on the entry control 21, the electronic device determines that the activity information checking instruction is received.

In this embodiment, the electronic device may display the entry control of the active friend list on the message page under any circumstances; and the electronic device may also display the entry control of the active friend list only when the active friend exists. Exemplarily, when the electronic device switches a current display page from another page to the message page, whether the active friend of the user exists at a current moment may be determined, where if the active friend of the user exists at the current moment, the entry control of the active friend list is displayed at the set position of the message page; and if the active friend of the user does not exist at the current moment, the entry control is not displayed on the message page, so as to avoid the case where no active friend exists in the displayed active friend list after the user triggers the entry control, thereby improving the user experience.

In addition, in order that the user knows the status of the active friend, when the electronic device displays the entry control, the relevant information of the active friend may be displayed in the entry control. For example, in the case where an online friend (the active friend) exists, the user name and/or avatar of at least one online friend and the number of online friends are displayed in the entry control (as shown in FIGS. 2 and 3) so that the user knows the status of the current online friend; and in the case where no online friend exists, the user name and/or avatar of at least one offline active friend are displayed in the entry control so that the user determines that no friend is currently online and knows the status of the offline active friend.

In S102, an active friend list is displayed, where the active friend list displays activity information of an active friend of the user, and the active friend is a friend who is online in a recent preset time period.

Figure 4:
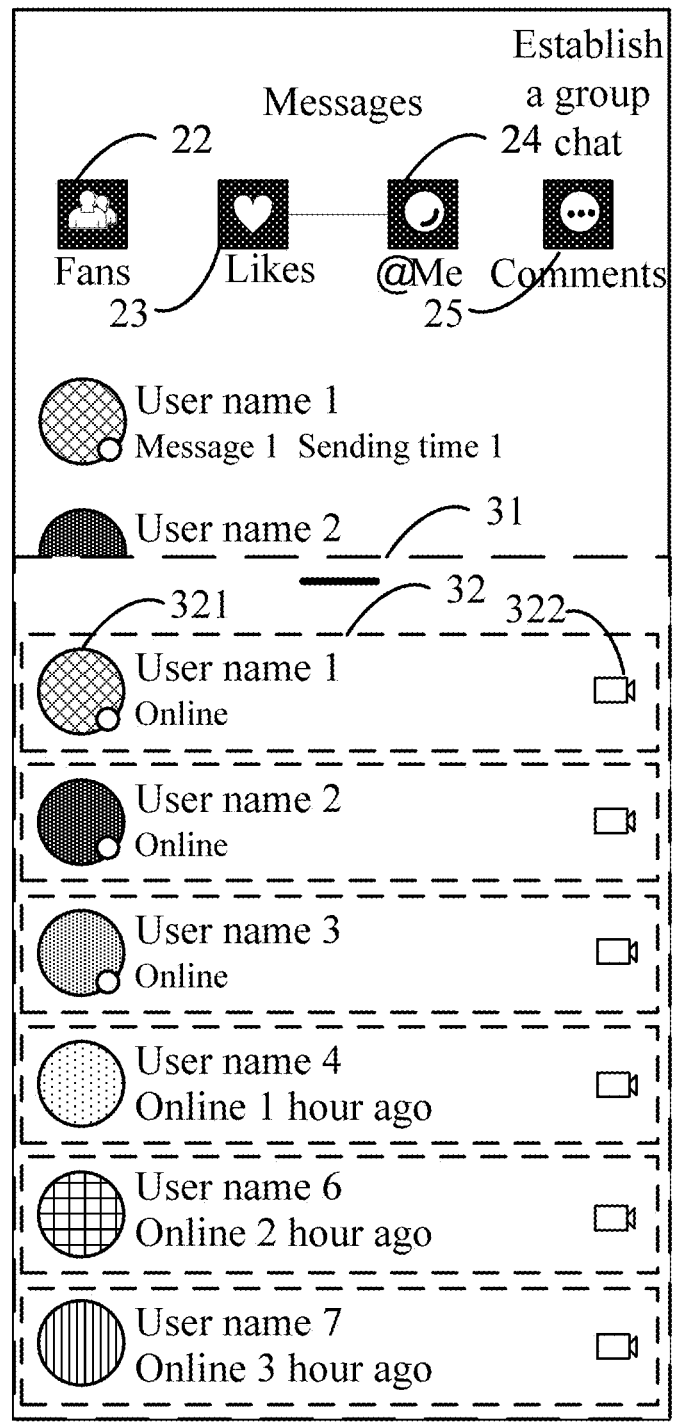
FIG. 4 is a schematic view of an active friend list according to an embodiment of the present disclosure.

The active friend is a friend who is online in a recent preset time period, that is, the active friend may be a friend who is online at the current moment or a friend who is offline at the current moment but has been online in the recent preset time period; the recent preset time period may be understood as a preset time period before the current moment and ending at the current moment. A length of the recent preset time period may be set as required. For example, the recent preset time period may be set to the last two days. Correspondingly, the active friend is a friend who is online in the last two days, such as a friend who is online at the current moment or a friend who is offline at the current moment but has been online in the last two days. The active friend list may be understood as a list used for display activity information of the active friend. The activity information may be the online status of the friend, such as whether the friend is online and when the friend is offline, that is, when the status of the friend switches from online to offline. As shown in FIG. 4, an active friend list 31 may include at least one display region 32 (as shown by dotted boxes in FIG. 4, and six display regions 32 are included in FIG. 4 as an example), each display region 32 may display active friend information of one active friend in the active friend list 31, and the active friend information includes the user name and the activity information and may also include a friend avatar 321. In addition, each display region 32 may also display a control for interacting with a target active friend (that is, an active friend corresponding to the active friend information displayed in this display region 32) corresponding to this display region 32 (the case where the control is a video call control 322 is used as an example in FIG. 4).

After receiving the activity information checking instruction, the electronic device displays the active friend list in a form of a floating window for the user to check. For example, the electronic device may directly display the active friend list in the form of the floating window at a set position; or the electronic device pops up the active friend list from one side of the screen (such as an upper side, a lower side, a left side or a right side) and moves the pop-up active friend list to a set position for display. A height of the active friend list may be a preset height value or may also be adjusted according to the number of active friends. For example, in the case where the number of active friends is relatively large, the height of the active friend list is increased until the active friend list can display all active friends or the height of the active friend list reaches a maximum display height (such as a height of a screen display region); and in the case where the number of active friends is relatively small, the height of the active friend list is reduced, which is not limited in this embodiment. A display order of at least one piece of active friend information in the active friend list may be set flexibly. For example, the active friend information may be sorted according to first letters of user names in the active friend information, or the at least one piece of active friend information is displayed in such a manner that online active friends are displayed first and offline active friends are displayed after the online active friends. Moreover, when the offline active friends are displayed, at least one offline friend may be sorted in an order of last online time from early to late.

To facilitate the checking and operation of the user, the electronic device may pop up the active friend list from the lower side of the screen, display the active friend list according to a preset height value, and display active friend information of at least one active friend in the active friend list in an order of online active friends-offline active friends. As shown in FIG. 4, a lower boundary line of the active friend list 31 may overlap with a lower display boundary of the screen. In the case where the number of active friends is relatively large and the active friends cannot be displayed completely in the active friend list 31, the active friend information displayed in the active friend list 31 may be changed based on a slide operation of the user, that is, the user may check the active friend information outside the screen display region in the active friend list 31 by sliding up and down in the active friend list 31.

In addition, in the case where the active friend list has been able to completely display first piece of active friend information in the active friend list, if the user continues to slide down in the active friend list, the active friend list may be closed, or when the user clicks on a top region of the active friend list, the active friend list may also be closed. That is, when the user wants to close the active friend list, the user may slide down in an active friend region or click on the top region of the active friend list; correspondingly, the electronic device may stop displaying the active friend list when detecting a downward slide gesture of the user in the case where the first piece of active friend information in the active friend list can be completely displayed or detecting a click operation in the top region of the active friend list.

In an embodiment, the step of displaying the active friend list includes in the case where a number of active friends is lower than a preset number threshold, displaying a friend discovery control in a set region of the active friend list. Correspondingly, the method further includes in the case where a friend discovery instruction is received, switching the current display page from the message page to a friend discovery page and displaying user information of a non-friend user to the user through the friend discovery page, where the friend discovery instruction is generated when the user triggers the friend discovery control.

The preset number threshold and the set region for displaying the friend discovery control may be set as required. For example, the preset number threshold may be set to a value such as 4 or 5; the set region may be the top or bottom of the active friend list; the friend discovery instruction may be used for instructing the electronic device to switch the current display page to the friend discovery page, where the friend discovery instruction may display the user information of the non-friend user to the user, for example, display user information of a user who is not yet a friend of this user but this user may know, so that this user may send a friend request to the user; the non-friend user may be understood as another user who is not yet a friend of this user.

Figure 5:
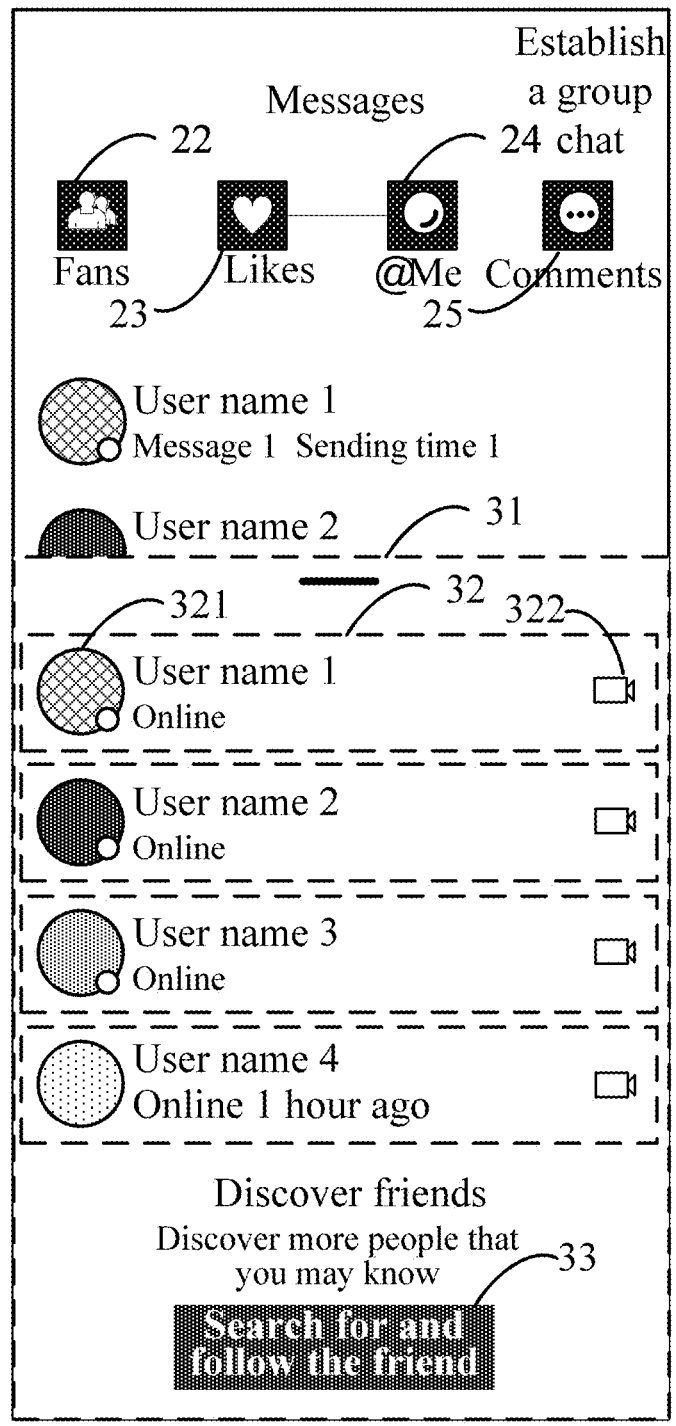
FIG. 5 is a schematic view of another active friend list according to an embodiment of the present disclosure.

In the preceding embodiments, as shown in FIG. 5, in the case where the number of active friends is lower than the preset number threshold, a friend discovery control 33 may be displayed in the set region of the active friend list 31 (for example, below the active friend list 31) so that the user may add friends in the case where few active friends exists.

The electronic device determines whether the number of active friends of the user is lower than the preset number threshold when displaying the active friend list, where if the number of active friends of the user is not lower than the preset number threshold, the electronic device does not display the friend discovery control; and if the number of active friends of the user is lower than the preset number threshold, the electronic device displays the friend discovery control in the set region of the active friend list. After the electronic device displays the friend discovery control in the set region of the active friend list, the user may trigger the friend discovery control, for example, click on the friend discovery control, when the user wants to add more friends or discover more people the user may know. Correspondingly, after detecting that the user triggers the friend discovery control, the electronic device determines that the friend discovery instruction is received, switches the current display page from the message page to the friend discovery page, and displays the user information of the non-friend user on the friend discovery page to the user so that the user may add a friend.

In the case where the number of active friends is lower than the preset number threshold, the electronic device may not display the friend discovery control in the active friend list, or continue to display recommended user information directly below the displayed active friend information, that is, continue to display information of another user recommended for this user to send a friend request. In the case where the number of active friends is higher than or equal to the preset number threshold, the electronic device may also display the friend discovery control in the active friend list, which is not limited in this embodiment.

The embodiment of the present disclosure provides a method for displaying active friend information such that the activity information checking instruction generated when the user triggers the entry control on the message page is received, and after the activity information checking instruction is received, the active friend list is displayed on a screen, so as to display the activity information of the active friend of this user through the active friend list. Through the preceding technical solutions, in this embodiment, the entry control of the active friend list is displayed on the message page, and when the user triggers the entry control, the activity information of the active friend is displayed to the user through the active friend list so that the user only needs to trigger the entry control displayed on the message page in order to check activity information of multiple active friends, thereby simplifying a process of checking the active friend information and shortening the time spent on checking the active friend information.

Figure 6:
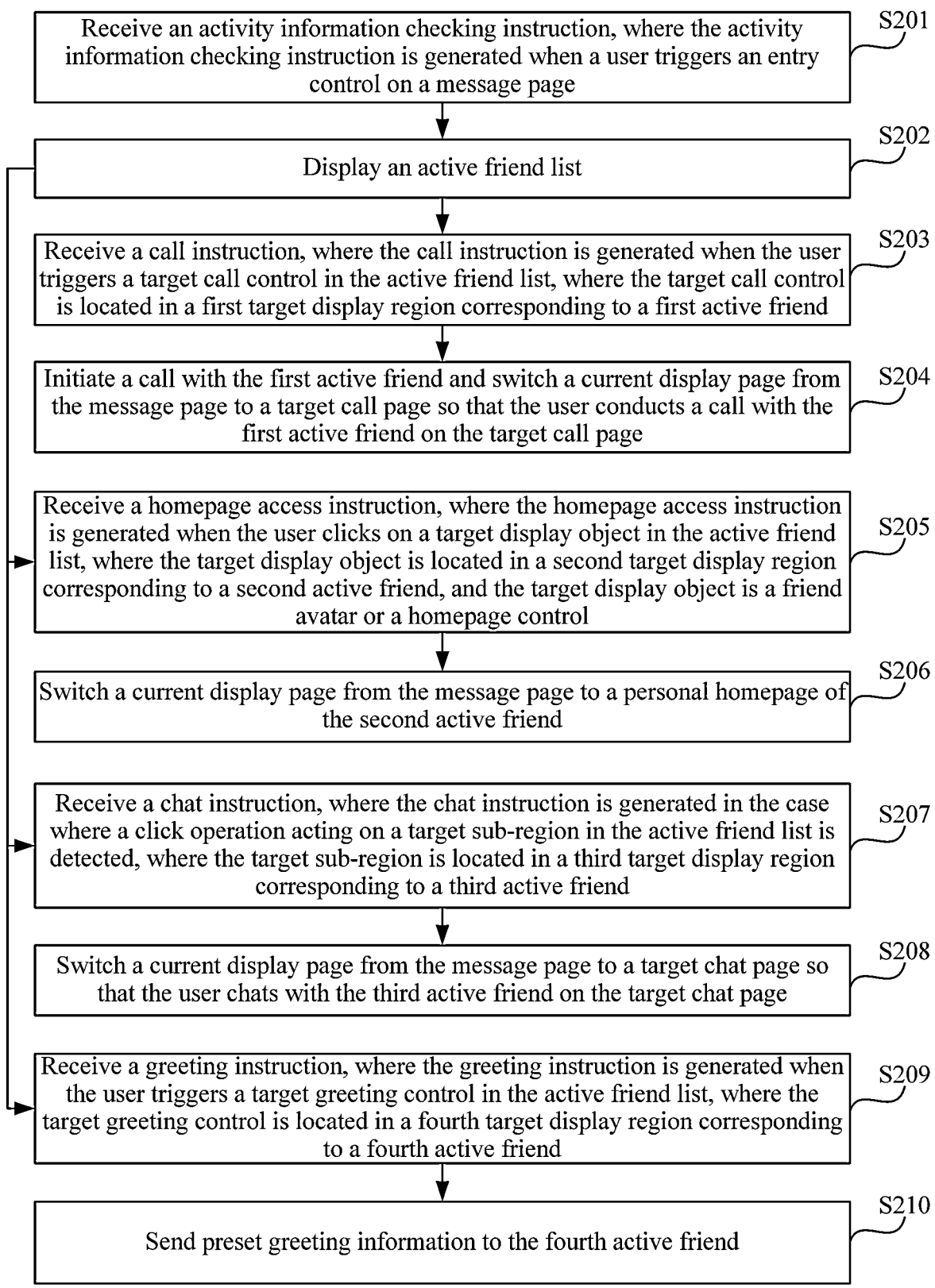
FIG. 6 is a flowchart of another method for displaying active friend information according to an embodiment of the present disclosure.

FIG. 6 is a flowchart of another method for displaying active friend information according to an embodiment of the present disclosure. The solution in this embodiment may be combined with one or more optional solutions in the preceding embodiments. In this embodiment, optionally, after the active friend list is displayed, the method further includes receiving a call instruction, where the call instruction is generated when the user triggers a target call control in the active friend list, where the target call control is located in a first target display region corresponding to a first active friend, and the target call control is a video call control or a voice call control; and initiating a call with the first active friend and switching a current display page from the message page to a target call page so that the user conducts a call with the first active friend on the target call page.

Optionally, after the active friend list is displayed, the method further includes receiving a homepage access instruction, where the homepage access instruction is generated when the user clicks on a target display object in the active friend list, where the target display object is located in a second target display region corresponding to a second active friend, and the target display object is a friend avatar or a homepage control; and switching a current display page from the message page to a personal homepage of the second active friend.

Optionally, after the active friend list is displayed, the method further includes receiving a chat instruction, where the chat instruction is generated in the case where a click operation acting on a target sub-region in the active friend list is detected, where the target sub-region is located in a third target display region corresponding to a third active friend, and the target sub-region is a chat control region or a non-control region other than a friend avatar region in the third target display region; and switching a current display page from the message page to a target chat page so that the user chats with the third active friend on the target chat page.

Optionally, after the active friend list is displayed, the method further includes receiving a greeting instruction, where the greeting instruction is generated when the user triggers a target greeting control in the active friend list, where the target greeting control is located in a fourth target display region corresponding to a fourth active friend; and sending preset greeting information to the fourth active friend.

Correspondingly, as shown in FIG. 6, the method for displaying the active friend information provided in this embodiment may include steps described below.

In S201, an activity information checking instruction is received, where the activity information checking instruction is generated when a user triggers an entry control on a message page.

In S202, an active friend list is displayed, and S203, S205, S207 or S209 is performed, where the active friend list displays activity information of an active friend of the user, and the active friend is a friend who is online in a recent preset time period.

In S203, a call instruction is received, where the call instruction is generated when the user triggers a target call control in the active friend list, where the target call control is located in a first target display region corresponding to a first active friend, and the target call control is a video call control or a voice call control.

In S204, a call with the first active friend is initiated and a current display page is switched from the message page to a target call page so that the user conducts a call with the first active friend on the target call page. Then, the operation ends.

The call instruction may be used for instructing the electronic device to initiate a call with the corresponding active friend and switch the current display page to a page for conducting a video call with the corresponding active friend. The current display page may be understood as a page currently displayed on the screen of the electronic device. The target call control is a call control triggered by the user. Correspondingly, the first target display region is a display region to which the target call control belongs, and the first active friend is a friend corresponding to the first target display region, that is, a friend corresponding to the active friend information displayed in the first target display region.

In this embodiment, each display region of the active friend list may display the video call control (the video call control 322 as shown in FIGS. 4 and 5) and/or the voice call control for the user to conduct a video call or a voice call with the corresponding active friend.

The electronic device displays the active friend list to the user, and when the user wants to conduct the video call/voice call with an active friend (that is, the first active friend) in the active friend list, the user triggers (for example, clicks on or drags) the video call control/voice call control (that is, the target call control) displayed in the display region corresponding to this active friend (that is, the first target display region). Correspondingly, when detecting that the user clicks on the video call control/voice call control in the first target display region, the electronic device determines that the call instruction is received, initiates the video call/voice call with the first active friend, for example, sends a video call request/voice call request to the first active friend, and switches the current display page from the message page to a video call page/voice call page.

In S205, a homepage access instruction is received, where the homepage access instruction is generated when the user clicks on a target display object in the active friend list, where the target display object is located in a second target display region corresponding to a second active friend, and the target display object is a friend avatar or a homepage control.

In S206, a current display page is switched from the message page to a personal homepage of the second active friend. Then, the operation ends.

The homepage access instruction may be used for instructing the electronic device to switch the current display page to the personal homepage of the corresponding friend. The target display object is the friend avatar or the homepage control clicked by the user. Correspondingly, the second target display region is a display region to which the target display object belongs, and the second active friend is a friend corresponding to the second target display region.

In this embodiment, the homepage control may or may not be displayed in each display region of the active friend list. In the case where the homepage control is displayed in each display region of the active friend list, the user may enter the personal homepage of the active friend by triggering (for example, clicking on or dragging) the homepage control in the display region in which the active friend information of the corresponding active friend is displayed; and in the case where the homepage control is not displayed in each display region of the active friend list, the user may enter the personal homepage of the active friend by clicking on the friend avatar of the active friend displayed in the active friend list. As shown in FIGS. 4 and 5, the user clicks on the friend avatar 321 of an active friend in the active friend list 31 to enter the personal homepage of this active friend.

The electronic device displays the active friend list to the user, and when the user wants to check the personal homepage of an active friend (that is, the second active friend), the user clicks on the friend avatar of the active friend (for the case where the homepage control is not displayed in each display region in the active friend list) or triggers the homepage control displayed in the display region (that is, the second target display region) corresponding to the active friend (for the case where the homepage control is displayed in each display region in the active friend list). Correspondingly, when detecting that the user clicks on the friend avatar in the second target display region or triggers the homepage control in the second target display region, the electronic device determines that the homepage access instruction is received and switches the current display page from the message page to the personal homepage of the second active friend for the user to check information displayed in the personal homepage of the second active friend, for example, for the user to check works and dynamics of the second active friend.

In S207, a chat instruction is received, where the chat instruction is generated in the case where a click operation acting on a target sub-region in the active friend list is detected, where the target sub-region is located in a third target display region corresponding to a third active friend, and the target sub-region is a chat control region or a non-control region other than a friend avatar region in the third target display region.

In S208, a current display page is switched from the message page to a target chat page so that the user chats with the third active friend on the target chat page. Then, the operation ends.

The chat instruction may be used for instructing the electronic device to switch the current display page to a chat page for the user to chat with the corresponding active friend. The non-control region is a region where no control is displayed. The target sub-region is a sub-region clicked by the user. Correspondingly, the third target display region is a display region to which the target sub-region belongs, the third active friend is a friend corresponding to the third target display region, and the target chat page is a page for the user to chat with the third active friend.

In this embodiment, a chat control may or may not be displayed in each display region of the active friend list. In the case where the chat control (a chat control 323 as shown in FIG. 7) is displayed in each display region of the active friend list, the user may trigger (such as click on or drag) the chat control in the display region in which the active friend information of the corresponding active friend is displayed, so as to enter a chat page when the user chats with this friend; and in the case where the chat control is not displayed in each display region of the active friend list (as shown in FIGS. 4 and 5), the user may click on the non-control region other than the friend avatar in the display region in which the active friend information of the corresponding active friend is displayed, so as to enter a chat page for the user to chat with this active friend.

The electronic device displays the active friend list to the user, and when the user wants to chat with an active friend (that is, the third active friend), the user clicks on the non-control region other than the friend avatar in the display region (that is, the third target display region) corresponding to this active friend (for the case where the chat control is not displayed in each display region in the active friend list) or triggers the chat control displayed in the third target display region (for the case where the chat control is displayed in each display region in the active friend list). Correspondingly, when detecting that the user clicks on the non-control region other than the friend avatar in the third target display region or triggers the chat control in the third target display region, the electronic device determines that the chat instruction is received and switches the current display page from the message page to a chat page for the user to chat with the third active friend so that the user chats with the third active friend on this chat page.

In an embodiment, in the case where chat controls are displayed in multiple display regions of the active friend list, the electronic device may also prompt the user for a new chat message by changing a display state of the chat control. The method for displaying the active friend information provided in this embodiment may further include in the case where chat information is received from the third active friend, switching a chat control in the third target display region from a first display state to a second display state to prompt the user to check the chat information.

Figure 7:
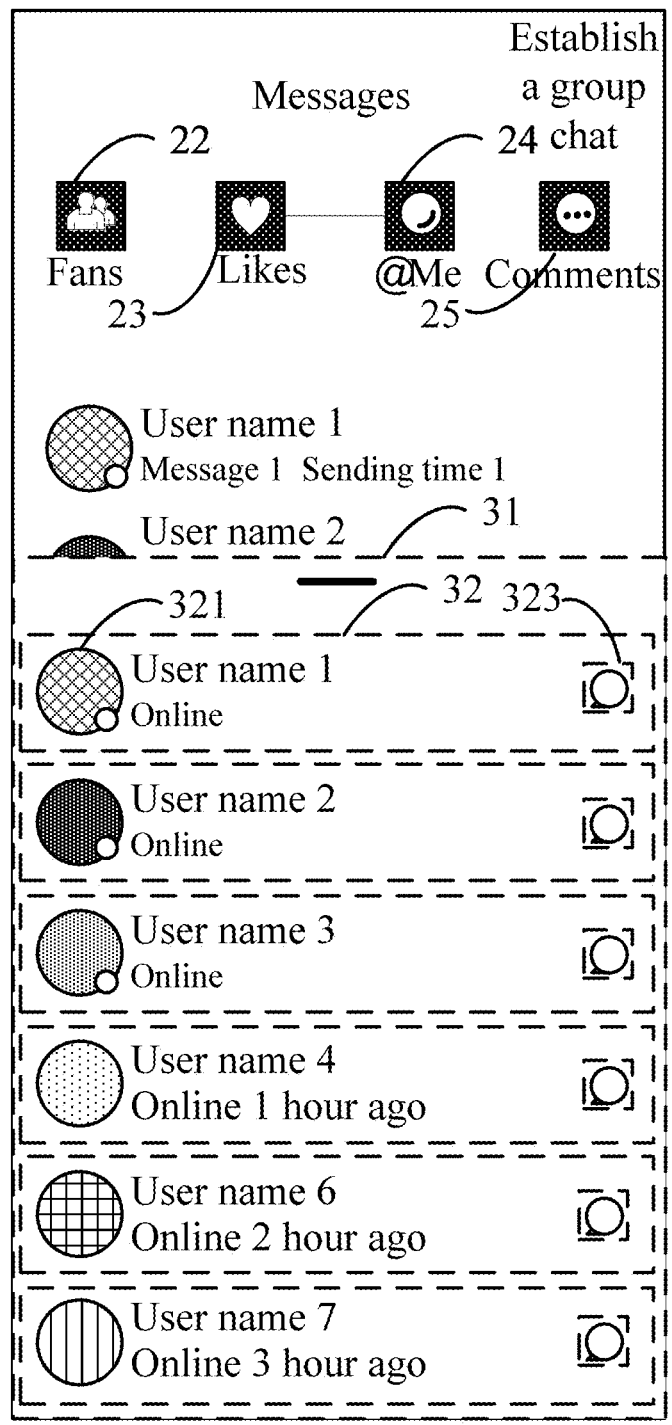
FIG. 7 is a schematic view of another active friend list according to an embodiment of the present disclosure.
Figure 8:
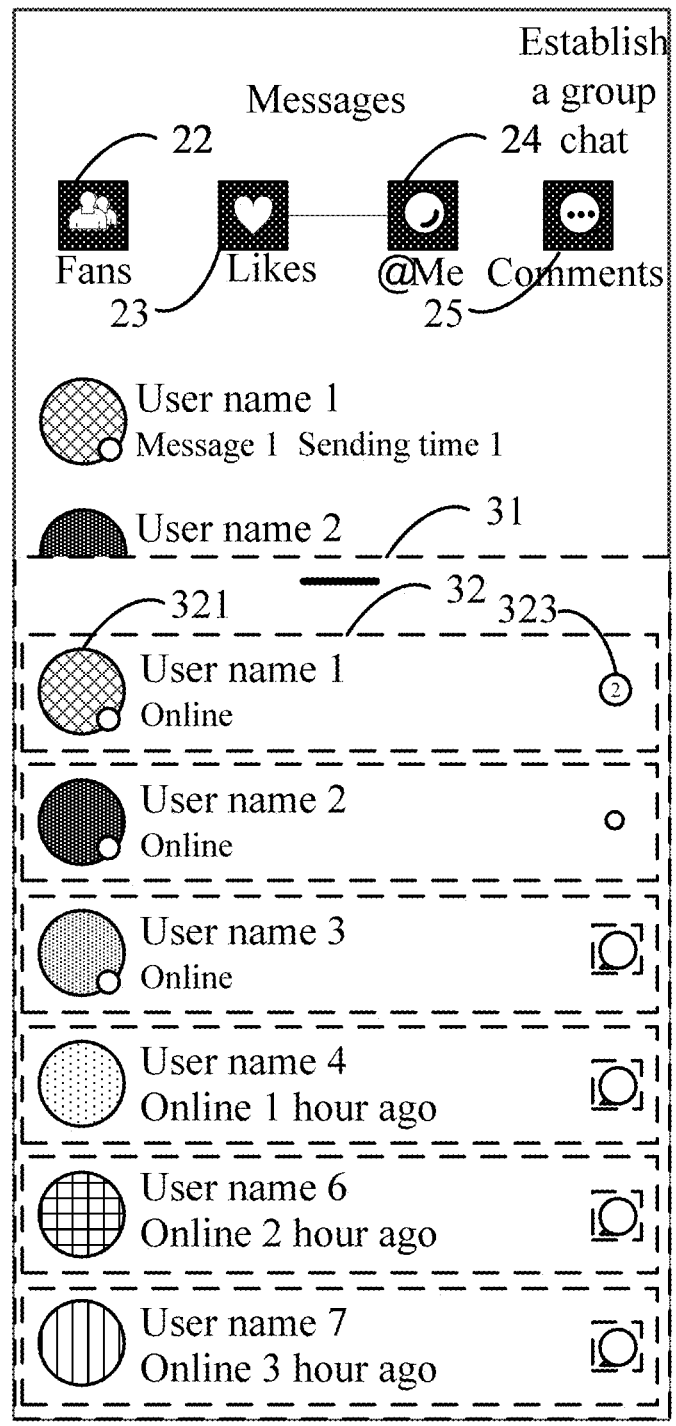
FIG. 8 is a schematic view of another active friend list according to an embodiment of the present disclosure.

Exemplarily, as shown in FIG. 7, in the case where no new chat message is received, that is, in the case where no chat message unread by the user exists, the electronic device may display the chat control 323 in each display region in the first display state; as shown in FIG. 8, when receiving a new chat message from an active friend, the electronic device may display the chat control 323 in the corresponding display region in the second display state, such as a circle.

In addition, with continued reference to FIG. 8, in order that the user determines the number of pieces of unread chat information, the electronic device may also display the number of received new chat messages of the corresponding friend in the chat control 323 switched to the second display state. For example, in the case where only one new chat message from an active friend (such as the active friend corresponding to user name 2 in FIG. 8) is received, the chat control 323 may be displayed in a relatively small size; and in the case where multiple new chat messages from an active friend (such as the active friend corresponding to user name 1 in FIG. 8) are received, the chat control 323 may be displayed in a relatively large size and the number of received new chat messages is displayed in this chat control 323 (the case where two new chat messages are received is used as an example in FIG. 8).

In an embodiment, when receiving the new chat message from an active friend, the electronic device may replace the activity information or message content of this active friend displayed in the active friend list with message content of the currently received new chat message for the user to check.

In S209, a greeting instruction is received, where the greeting instruction is generated when the user triggers a target greeting control in the active friend list, where the target greeting control is located in a fourth target display region corresponding to a fourth active friend.

In S210, preset greeting information is sent to the fourth active friend.

Figure 9:
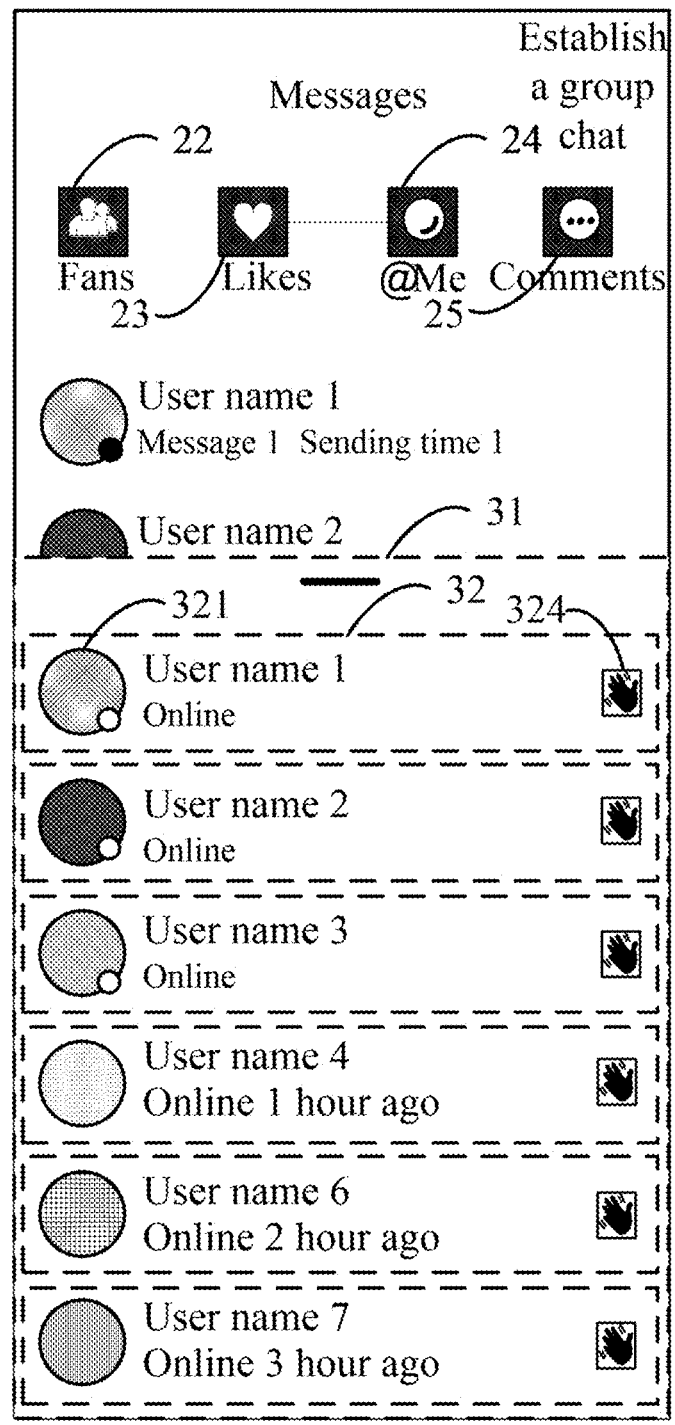
FIG. 9 is a schematic view of another active friend list according to an embodiment of the present disclosure.

The greeting instruction may be used for instructing the electronic device to send a preset greeting message to the corresponding active friend, where the preset greeting message may be understood as a message with preset message content, and the message content may be an emoticon, a picture, or a text. The target greeting control is a greeting control triggered by the user. Correspondingly, the fourth target display region is a display region to which the target greeting control belongs, and the fourth active friend is a friend corresponding to the fourth target display region. In this embodiment, as shown in FIG. 9, the greeting control 324 may be displayed in each display region 32 of the active friend list 31 so that the user can quickly send the preset greeting message to the corresponding active friend.

The electronic device displays the active friend list to the user, and when the user wants to send the preset greeting message to an active friend (that is, the fourth active friend) in the active friend list, the user clicks on the greeting control (that is, the target greeting control) displayed in the display region (that is, the fourth target display region) corresponding to this active friend. Correspondingly, when detecting that the user clicks on the greeting control in the fourth target display region, the electronic device determines that the greeting instruction is received and sends the preset greeting message to the fourth active friend, for example, sends a preset greeting emoticon to the fourth active friend.

The "operation ends" in the preceding steps only means that the electronic device ends an operation in response to a currently received instruction (such as the call instruction, the homepage access instruction, the chat instruction or the greeting instruction), that is, the operation in response to the currently received instruction is completed, which is not used for limiting the electronic device to perform no more operations. In this embodiment, the first target display region, the second target display region, the third target display region, and the fourth target display region may be the same display region or different display regions in the active friend list. Correspondingly, in this embodiment, the first active friend, the second active friend, the third active friend, and the fourth active friend may be the same active friend or different active friends. In the schematic diagram of the active friend list provided in this embodiment, only one control is shown in each display region, but two or more controls mentioned above may also be displayed in each display region in this embodiment, which may be set as required.

In this embodiment, when a target friend who is close to the user goes online, if the user has closed the active friend list or switched the current display page to another page other than the message page, online prompt information may also be sent to the user, thereby ensuring that the user can know the online status of the friend in time under the premise of avoiding the interference caused by frequent push messages to the user. Optionally, the method for displaying the active friend information provided in this embodiment may further include in the case where a friend online prompt instruction from a server is received, generating and displaying online prompt information to prompt the user that a target friend is online, where the friend online prompt instruction is generated in the case where the server detects that the target friend of the user is online, and intimacy between the target friend and the user is greater than a preset intimacy threshold.

Figure 10:
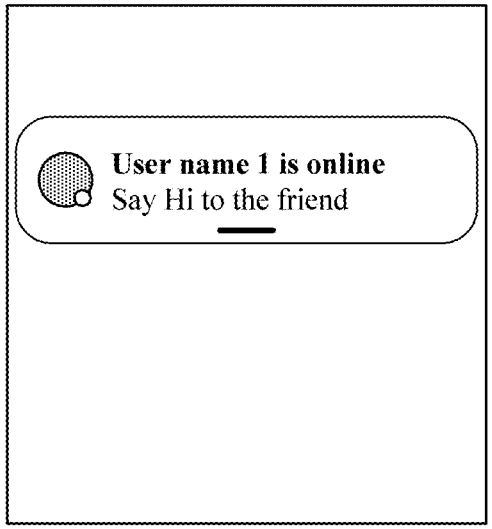
FIG. 10 is a schematic view of online prompt information according to an embodiment of the present disclosure.
Figure 11:
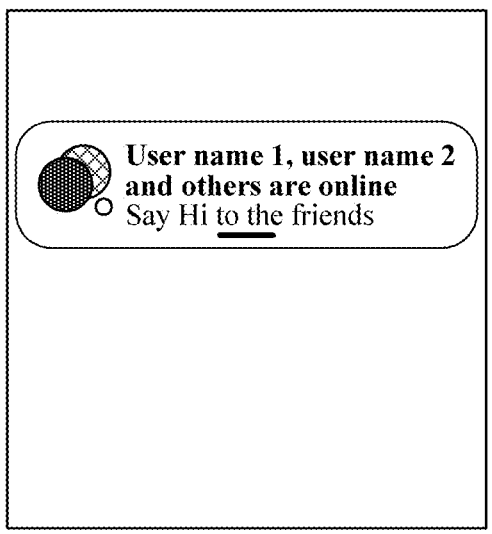
FIG. 11 is a schematic view of online prompt information of another type according to an embodiment of the present disclosure.

Exemplarily, the server detects whether the target friend whose intimacy with the user is greater than the preset intimacy threshold is online, and when detecting that the user has the target friend online, the server sends the friend online prompt instruction to the electronic device. Correspondingly, after receiving the friend online prompt instruction from the server, the electronic device generates and displays the online prompt information so as to prompt the user that the target friend is online. The intimacy between the user and a friend may be determined according to the number of interactions or interaction frequency between the user and this friend, and the preset intimacy threshold may be set by the staff or the user as required. For example, the staff sets the preset intimacy threshold on the server side, or the user inputs the preset intimacy threshold on a corresponding page (for example, a setting page) of the electronic device; the online prompt information may display the friend avatar and user name of the target friend who is currently online (as shown in FIG. 10; in FIG. 10, it is assumed that the target friend corresponding to user name 1 is online); and the online prompt information may also display the friend avatar and user name of at least one friend who is currently online (as shown in FIG. 11; in FIG. 11, it is assumed that friends corresponding to user name 1 and user name 2 are online).

In this embodiment, whether to prompt the user that the target friend is online may also be determined based on the setting of the user. For example, a target friend online prompt switch may be set on a page (for example, the setting page). If the user triggers and turns on this target friend online prompt switch, that is, if this target friend online prompt switch is on, the server detects whether the target friend of the user is online, and when detecting that the target friend of the user is online, the server sends the friend online prompt instruction to the electronic device. Correspondingly, when receiving the friend online prompt instruction from the server, the electronic device generates and displays the online prompt information so as to prompt the user that the target friend is online. If the user triggers and turns off this target friend online prompt switch, that is, if this target friend online prompt switch is off, the server may not perform an operation of detecting whether the target friend of this user is online, or when detecting that the target friend of this user is online, the server may not perform an operation of sending the friend online prompt instruction to the electronic device, or when receiving the friend online prompt instruction from the server, the electronic device may not perform an operation of generating and displaying the online prompt information so that the electronic device does not prompt the user that the target friend is online, thereby avoiding the interference caused by the target friend online prompt to the user.

In an embodiment, after the online prompt information is generated and displayed, the method further includes receiving a list displaying instruction, where the list displaying instruction is generated in the case where a click operation acting on an information display region of the online prompt information is detected; and switching a current display page to the message page and displaying the active friend list on the message page.

The list displaying instruction may be used for instructing the electronic device to switch the current display page to the message page and display the active friend list on the message page.

In the preceding embodiment, the electronic device displays the online prompt information to the user, and when the user wants to check the current online friend or interact with an online friend, the user clicks on the display region of the online prompt information. Correspondingly, when detecting a click operation of the user in the display region of the online prompt information, the electronic device determines that the list displaying instruction is received, switches the current display page to the message page, and displays the active friend list on the message page for the user to quickly check and interact with the online friend.

Therefore, the electronic device may switch the current display page based on different received instructions so that not only the user can timely and accurately check the activity of the friend, but also the user is provided with a convenient and efficient manner of interaction, thereby reducing the time the user spends on interacting with the active friend, promoting interaction and communication between friends, and enhancing the sense of social communication atmosphere of the user.

Figure 12:
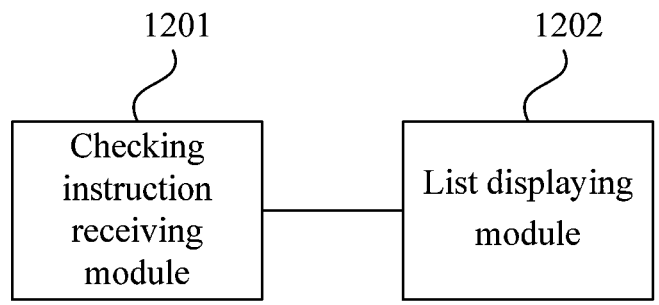
FIG. 12 is a block diagram illustrating a structure of an apparatus for displaying active friend information according to an embodiment of the present disclosure.

FIG. 12 is a block diagram illustrating a structure of an apparatus for displaying active friend information according to an embodiment of the present disclosure. The apparatus may be implemented by software and/or hardware and may be configured in an electronic device. For example, the apparatus may be configured in a smart phone or a tablet computer. This apparatus may display the active friend information by performing the method for displaying the active friend information. As shown in FIG. 12, this apparatus includes a checking instruction receiving module 1201 and a list displaying module 1202. The checking instruction receiving module 1201 is configured to receive an activity information checking instruction, where the activity information checking instruction is generated when a user triggers an entry control on a message page. The list displaying module 1202 is configured to display an active friend list, where the active friend list displays activity information of an active friend of the user, and the active friend is a friend who is online in a recent preset time period.

In the apparatus for displaying the active friend information provided in this embodiment, the checking instruction receiving module 1201 receives the activity information checking instruction generated when the user triggers the entry control on the message page, and the list displaying module 1202 displays the active friend list on the screen, where the active friend list displays the activity information of the active friend of this user. Through the preceding technical solutions, in this embodiment, the entry control of the active friend list is displayed on the message page, and when the user triggers the entry control, the activity information of the active friend is displayed to the user through the active friend list so that the user only needs to trigger the entry control displayed on the message page in order to check activity information of multiple active friends, thereby simplifying a process of checking the active friend information and shortening the time spent on checking the active friend information.

The apparatus for displaying the active friend information provided in this embodiment may further include a call instruction receiving module and a call module. The call instruction receiving module is configured to, after the active friend list is displayed, receive a call instruction, where the call instruction is generated when the user triggers a target call control in the active friend list, where the target call control is located in a first target display region corresponding to a first active friend, and the target call control is a video call control or a voice call control. The call module is configured to initiate a call with the first active friend and switch a current display page from the message page to a target call page so that the user conducts a call with the first active friend on the target call page.

The apparatus for displaying the active friend information provided in this embodiment may further include an access instruction receiving module and a homepage switching module. The access instruction receiving module is configured to, after the active friend list is displayed, receive a homepage access instruction, where the homepage access instruction is generated when the user clicks on a target display object in the active friend list, where the target display object is located in a second target display region corresponding to a second active friend, and the target display object is a friend avatar or a homepage control. The homepage switching module is configured to switch a current display page from the message page to a personal homepage of the second active friend.

The apparatus for displaying the active friend information provided in this embodiment may further include a chat instruction receiving module and a chat page switching module. The chat instruction receiving module is configured to, after the active friend list is displayed, receive a chat instruction, where the chat instruction is generated in the case where a click operation acting on a target sub-region in the active friend list is detected, where the target sub-region is located in a third target display region corresponding to a third active friend, and the target sub-region is a chat control region or a non-control region other than a friend avatar region in the third target display region. The chat page switching module is configured to switch a current display page from the message page to a target chat page so that the user chats with the third active friend on the target chat page.

The apparatus for displaying the active friend information provided in this embodiment may further include a state switching module. The state switching module is configured to, in the case where chat information is received from the third active friend, switch a chat control in the third target display region from a first display state to a second display state to prompt the user to check the chat information.

The apparatus for displaying the active friend information provided in this embodiment may further include a greeting instruction receiving module and an information sending module. The greeting instruction receiving module is configured to, after the active friend list is displayed, receive a greeting instruction, where the greeting instruction is generated when the user triggers a target greeting control in the active friend list, where the target greeting control is located in a fourth target display region corresponding to a fourth active friend. The information sending module is configured to send preset greeting information to the fourth active friend.

In the preceding solutions, the list displaying module 1202 may further be configured to, in the case where a number of active friends is lower than a preset number threshold, display a friend discovery control in a set region of the active friend list. Correspondingly, the apparatus for displaying the active friend information provided in this embodiment may further include a friend page switching module. The friend page switching module is configured to, in the case where a friend discovery instruction is received, switch the current display page from the message page to a friend discovery page and display user information of a non-friend user to the user through the friend discovery page, where the friend discovery instruction is generated when the user triggers the friend discovery control.

The apparatus for displaying the active friend information provided in this embodiment may further include an information prompt module. The information prompt module is configured to, in the case where a friend online prompt instruction from a server is received, generate and display online prompt information to prompt the user that a target friend is online, where the friend online prompt instruction is generated in the case where the server detects that the target friend of the user is online, and intimacy between the target friend and the user is greater than a preset intimacy threshold.

The apparatus for displaying the active friend information provided in this embodiment may further include a list displaying instruction receiving module and a friend list switching module. The list displaying instruction receiving module is configured to, after the online prompt information is generated and displayed, receive a list displaying instruction, where the list displaying instruction is generated in the case where a click operation acting on an information display region of the online prompt information is detected. The friend list switching module is configured to switch a current display page to the message page and display the active friend list on the message page.

The apparatus for displaying the active friend information according to this embodiment of the present disclosure can perform the method for displaying the active friend information according to any embodiment of the present disclosure and has function modules and effects corresponding to the performed method for displaying the active friend information. For technical details not described in detail in this embodiment, reference may be made to the method for displaying the active friend information according to any embodiment of the present disclosure.

Figure 13:
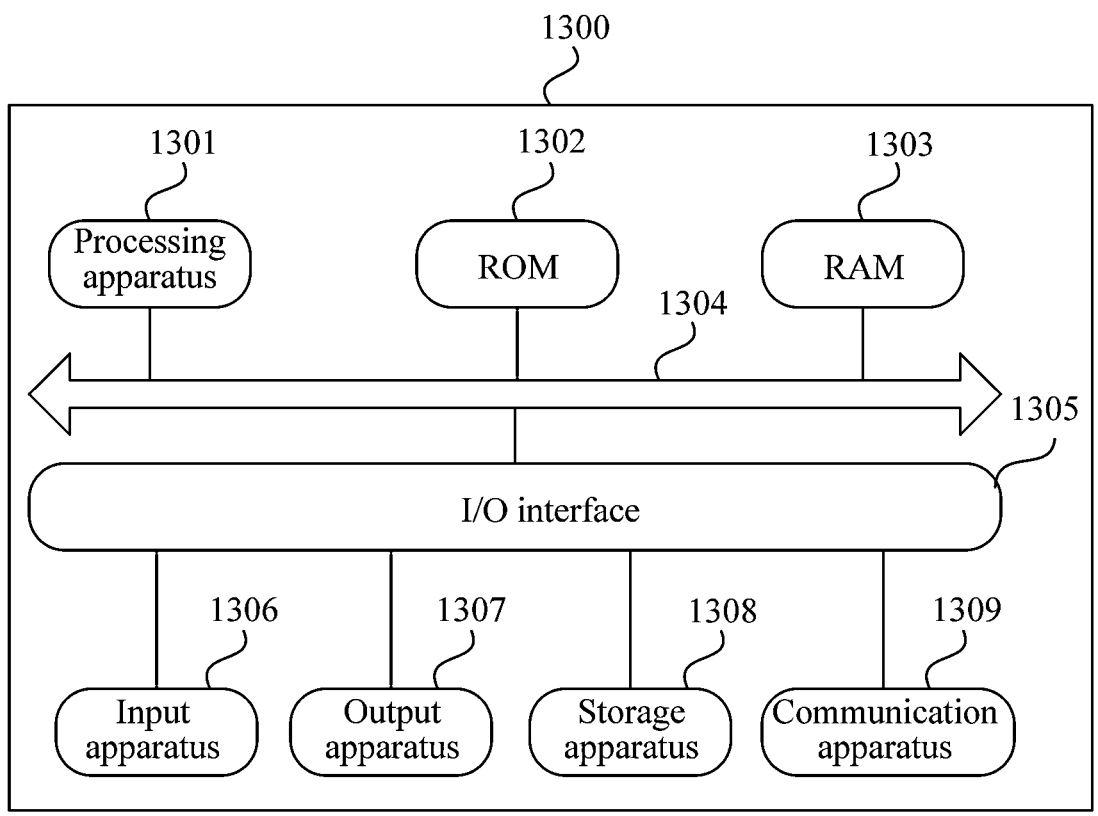
FIG. 13 is a structural diagram of an electronic device according to an embodiment of the present disclosure.

Referring to FIG. 13, FIG. 13 is a structural diagram of an electronic device (such as a terminal device) 1300 applicable to implementing the embodiments of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 13 is merely an example and is not intended to limit the function and usage scope of the embodiments of the present disclosure.

As shown in FIG. 13, the electronic device 1300 may include a processing apparatus 1301 (such as a central processing unit and a graphics processing unit). The processing apparatus 1301 may perform multiple types of appropriate operations and processing based on a program stored in a read-only memory (ROM) 1302 or a program loaded from a storage apparatus 1308 to a random-access memory (RAM) 1303. Multiple programs and data required for the operation of the electronic device 1300 are also stored in the RAM 1303. The processing apparatus 1301, the ROM 1302 and the RAM 1303 are connected to each other through a bus 1304. An input/output (I/O) interface 1305 is also connected to the bus 1304.

Generally, the following apparatus may be connected to the I/O interface 1305: an input apparatus 1306 such as a touch screen, a touch pad, a keyboard, a mouse, a camera, a microphone, an accelerometer, and a gyroscope; an output apparatus 1307 such as a liquid crystal display (LCD), a speaker, and a vibrator; the storage apparatus 1308 such as a magnetic tape and a hard disk, and a communication apparatus 1309. The communication apparatus 1309 may allow the electronic device 1300 to perform wireless or wired communication with other devices so as to exchange data. Although FIG. 13 shows the electronic device 1300 having multiple types of apparatuses, not all of the apparatuses shown herein need to be implemented or present. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 1309, or may be installed from the storage apparatus 1308, or may be installed from the ROM 1302. When the computer program is executed by the processing apparatus 1301, the preceding functions defined in the method of the embodiments of the present disclosure are executed.

The preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. Examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit the program used by or used in conjunction with the instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as a HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The computer-readable medium carries one or more programs. When executed by the electronic device, the one or more programs cause the electronic device to: receive an activity information checking instruction, where the activity information checking instruction is generated when a user triggers an entry control on a message page; and display an active friend list, where the active friend list displays activity information of an active friend of the user, and the active friend is a friend who is online in a recent preset time period.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a module is not intended to limit the unit in a circumstance.

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, the machine-readable medium may be a tangible medium that may include or store the program used by or used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof.

According to one or more embodiments of the present disclosure, example one provides a method for displaying active friend information. The method includes steps described below.

An activity information checking instruction is received, where the activity information checking instruction is generated when a user triggers an entry control on a message page.

An active friend list is displayed, where the active friend list displays activity information of an active friend of the user, and the active friend is a friend who is online in a recent preset time period.

According to one or more embodiments of the present disclosure, according to the method described in example one, after the active friend list is displayed, example two further includes steps described below.

A call instruction is received, where the call instruction is generated when the user triggers a target call control in the active friend list, where the target call control is located in a first target display region corresponding to a first active friend, and the target call control is a video call control or a voice call control. A call with the first active friend is initiated and a current display page is switched from the message page to a target call page so that the user conducts a call with the first active friend on the target call page.

According to one or more embodiments of the present disclosure, according to the method described in example one, after the active friend list is displayed, example three further includes steps described below.

A homepage access instruction is received, where the homepage access instruction is generated when the user clicks on a target display object in the active friend list, where the target display object is located in a second target display region corresponding to a second active friend, and the target display object is a friend avatar or a homepage control.

A current display page is switched from the message page to a personal homepage of the second active friend.

According to one or more embodiments of the present disclosure, according to the method described in example one, after the active friend list is displayed, example four further includes steps described below.

A chat instruction is received, where the chat instruction is generated in the case where a click operation acting on a target sub-region in the active friend list is detected, where the target sub-region is located in a third target display region corresponding to a third active friend, and the target sub-region is a chat control region or a non-control region other than a friend avatar region in the third target display region. A current display page is switched from the message page to a target chat page so that the user chats with the third active friend on the target chat page.

According to one or more embodiments of the present disclosure, according to the method described in example four, example five further includes a step described below.

In the case where chat information is received from the third active friend, a chat control in the third target display region is switched from a first display state to a second display state so as to prompt the user to check the chat information.

According to one or more embodiments of the present disclosure, according to the method described in example one, after the active friend list is displayed, example six further includes steps described below.

A greeting instruction is received, where the greeting instruction is generated when the user triggers a target greeting control in the active friend list, where the target greeting control is located in a fourth target display region corresponding to a fourth active friend.

Preset greeting information is sent to the fourth active friend.

According to one or more embodiments of the present disclosure, according to the method described in any one of examples one to six, the step of displaying the active friend list includes a step described below.

In the case where a number of active friends is lower than a preset number threshold, a friend discovery control is displayed in a set region of the active friend list.

Correspondingly, the method further includes a step described below.

In the case where a friend discovery instruction is received, the current display page is switched from the message page to a friend discovery page and user information of a non-friend user is displayed to the user through the friend discovery page, where the friend discovery instruction is generated when the user triggers the friend discovery control.

According to one or more embodiments of the present disclosure, according to the method described in any one of examples one to six, example eight further includes a step described below.

In the case where a friend online prompt instruction from a server is received, online prompt information is generated and displayed to prompt the user that a target friend is online, where the friend online prompt instruction is generated in the case where the server detects that the target friend of the user is online, and intimacy between the target friend and the user is greater than a preset intimacy threshold.

According to one or more embodiments of the present disclosure, according to the method described in example eight, after the online prompt information is generated and displayed, example nine further includes steps described below.

A list displaying instruction is received, where the list displaying instruction is generated in the case where a click operation acting on an information display region of the online prompt information is detected. A current display page is switched to the message page and the active friend list is displayed on the message page.

According to one or more embodiments of the present disclosure, example ten provides an apparatus for displaying active friend information. The apparatus includes a checking instruction receiving module and a list displaying module.

The checking instruction receiving module is configured to receive an activity information checking instruction, where the activity information checking instruction is generated when a user triggers an entry control on a message page.

The list displaying module is configured to display an active friend list, where the active friend list displays activity information of an active friend of the user, and the active friend is a friend who is online in a recent preset time period.

According to one or more embodiments of the present disclosure, example eleven provides an electronic device. The electronic device includes one or more processors and a memory configured to store one or more programs.

The one or more programs, when executed by the one or more processors, cause the one or more processors to perform the method for displaying the active friend information according to any one of examples one to nine.

According to one or more embodiments of the present disclosure, example twelve provides a computer-readable storage medium storing a computer program which, when executed by a processor, is used for performing the method for displaying the active friend information according to any one of examples one to nine.

In addition, although multiple operations are depicted in a particular order, this should not be construed as requiring that such operations should be performed in the particular order shown or in a sequential order. In certain circumstances, multitasking and parallel processing may be advantageous. Similarly, although multiple implementation details are included in the above discussion, these should not be construed as limiting the scope of the present disclosure. Some features described in the context of separate embodiments may also be implemented in combination in a single embodiment. Conversely, multiple features described in the context of a single embodiment may also be implemented in multiple embodiments, individually, or in any suitable subcombination.

What is claimed is:

1. A method for displaying active friend information, comprising:
   receiving an activity information checking instruction, wherein the activity information checking instruction is generated when a user triggers an entry control on a message page; and
   displaying an active friend list, wherein the active friend list displays activity information of each of a plurality of active friends of the user, and each of the plurality of active friends is a friend who is online in a recent preset time period;
   in a case where a friend online prompt instruction is received from a server, the active friend list is closed or a current display page is switched from the message page to another page other than the message page, generating and displaying online prompt information to prompt the user that a target friend is online, wherein the friend online prompt instruction is generated in a case where the server detects that the target friend of the user is online, and intimacy between the target friend and the user is greater than a preset intimacy threshold;
   receiving a list displaying instruction, wherein the list displaying instruction is generated in a case where a click operation acting on an information display region of the online prompt information is detected; and
   switching the current display page to the message page and displaying the active friend list on the message page.

2. The method of claim 1, wherein after the active friend list is displayed, the method further comprises:
   receiving a call instruction, wherein the call instruction is generated when the user triggers a target call control in the active friend list, the target call control is located in a first target display region corresponding to a first active friend, and the target call control is a video call control or a voice call control; and initiating a call with the first active friend and switching the current display page from the message page to a target call page.

3. The method of claim 1, wherein after the active friend list is displayed, the method further comprises:

receiving a chat instruction, wherein the chat instruction is generated in a case where a click operation acting on a target sub-region in the active friend list is detected, the target sub-region is located in a third target display region corresponding to a third active friend, and the target sub-region is a chat control region or a non-control region other than a friend avatar region in the third target display region; and switching the current display page from the message page to a target chat page.

4. The method of claim 3, further comprising:

in a case where chat information is received from the third active friend, switching a chat control in the third target display region from a first display state to a second display state to prompt the user to check the chat information.

5. Method of claim 1, wherein after the active friend list is displayed, the method further comprises:

receiving a greeting instruction, wherein the greeting instruction is generated when the user triggers a target greeting control in the active friend list and the target greeting control is located in a fourth target display region corresponding to a fourth active friend; and sending preset greeting information to the fourth active friend.

6. The method of claim 1, wherein after the active friend list is displayed, the method further comprises:

receiving a homepage access instruction, wherein the homepage access instruction is generated when the user clicks on a target display object in the active friend list, the target display object is located in a second target display region corresponding to a second active friend, and the target display object is a friend avatar or a homepage control; and switching the current display page from the message page to a personal homepage of the first active friend.

7. The method of claim 1, wherein, displaying the active friend list comprises: in a case where a number of the plurality of active friends is lower than a preset number threshold, displaying a friend discovery control in a set region of the active friend list; and the method further comprises: in a case where a friend discovery instruction is received, switching the current display page from the message page to a friend discovery page and displaying user information of a non-friend user to the user through the friend discovery page, wherein the friend discovery instruction is generated when the user triggers the friend discovery control.

8. An electronic device, comprising:

at least one processor; and a memory configured to store at least one program;

wherein the at least one program, when executed by the at least one processor, cause the at least one processor to perform:

receiving an activity information checking instruction, wherein the activity information checking instruction is generated when a user triggers an entry control on a message page; and displaying an active friend list, wherein the active friend list displays activity information of each of a plurality of active friends of the user, and each of the plurality of active friends is a friend who is online in a recent preset time period;

in a case where a friend online prompt instruction is received from a server, and the active friend list is closed or a current display page is switched from the message page to another page other than the message page, generating and displaying online prompt information to prompt the user that a target friend is online, wherein the friend online prompt instruction is generated in a case where the server detects that the target friend of the user is online, and intimacy between the target friend and the user is greater than a preset intimacy threshold;

receiving a list displaying instruction, wherein the list displaying instruction is generated in a case where a click operation acting on an information display region of the online prompt information is detected; and switching the current display page to the message page and displaying the active friend list on the message page.

9. The electronic device of claim 8, wherein after the active friend list is displayed, the at least one processor is further configured to:

receive a call instruction, wherein the call instruction is generated when the user triggers a target call control in the active friend list, the target call control is located in a first target display region corresponding to a first active friend, and the target call control is a video call control or a voice call control; and initiate a call with the first active friend and switch the current display page from the message page to a target call page.

10. The electronic device of claim 8, wherein after the active friend list is displayed, the at least one processor is further configured to:

receive a chat instruction, wherein the chat instruction is generated in a case where a click operation acting on a target sub-region in the active friend list is detected, the target sub-region is located in a third target display region corresponding to a third active friend, and the target sub-region is a chat control region or a non-control region other than a friend avatar region in the third target display region; and switch the current display page from the message page to a target chat page.

11. The electronic device of claim 10, wherein the at least one processor is further configured to:

in a case where chat information is received from the third active friend, switch a chat control in the third target display region from a first display state to a second display state to prompt the user to check the chat information.

12. The electronic device of claim 8, wherein after the active friend list is displayed, the at least one processor is further configured to:

receive a greeting instruction, wherein the greeting instruction is generated when the user triggers a target greeting control in the active friend list and the target greeting control is located in a fourth target display region corresponding to a fourth active friend; and send preset greeting information to the fourth active friend.

13. The electronic device of claim 8, wherein after the active friend list is displayed, the at least one processor is further configured to:
- receive a homepage access instruction, wherein the homepage access instruction is generated when the user clicks on a target display object in the active friend list, the target display object is located in a second target display region corresponding to a second active friend, and the target display object is a friend avatar or a homepage control; and
- switch the current display page from the message page to a personal homepage of the first active friend.

14. The electronic device of claim 8, wherein,
the at least one processor displays the active friend list by, in a case where a number of the plurality of active friends is lower than a preset number threshold, displaying a friend discovery control in a set region of the active friend list; and
the at least one processor is further configured to perform: in a case where a friend discovery instruction is received, switching the current display page from the message page to a friend discovery page and displaying user information of a non-friend user to the user through the friend discovery page, wherein the friend discovery instruction is generated when the user triggers the friend discovery control.

15. A non-transitory computer-readable storage medium storing a computer program which, when executed by a processor, is configured to:
- receive an activity information checking instruction, wherein the activity information checking instruction is generated when a user triggers an entry control on a message page; and
- display an active friend list, wherein the active friend list displays activity information of each of a plurality of active friends of the user, and each of the plurality of active friends is a friend who is online in a recent preset time period;
- in a case where a friend online prompt instruction is received from a server, the active friend list is closed or a current display page is switched from the message page to another page other than the message page, generate and display online prompt information to prompt the user that a target friend is online, wherein the friend online prompt instruction is generated in a case where the server detects that the target friend of the user is online, and intimacy between the target friend and the user is greater than a preset intimacy threshold;
- receive a list displaying instruction, wherein the list displaying instruction is generated in a case where a click operation acting on an information display region of the online prompt information is detected; and
- switch the current display page to the message page and displaying the active friend list on the message page.

\* \* \* \* \*